United States Patent Office 2,963,899
Patented Dec. 13, 1960

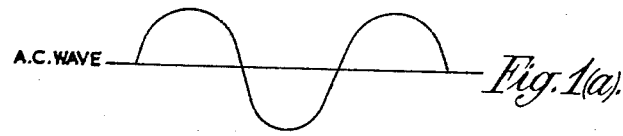
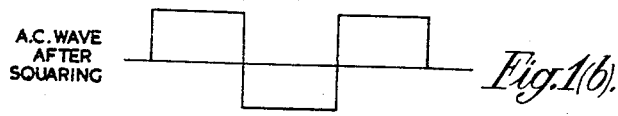
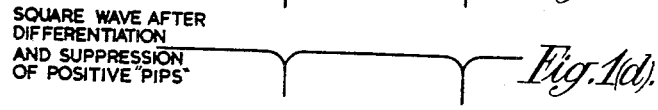
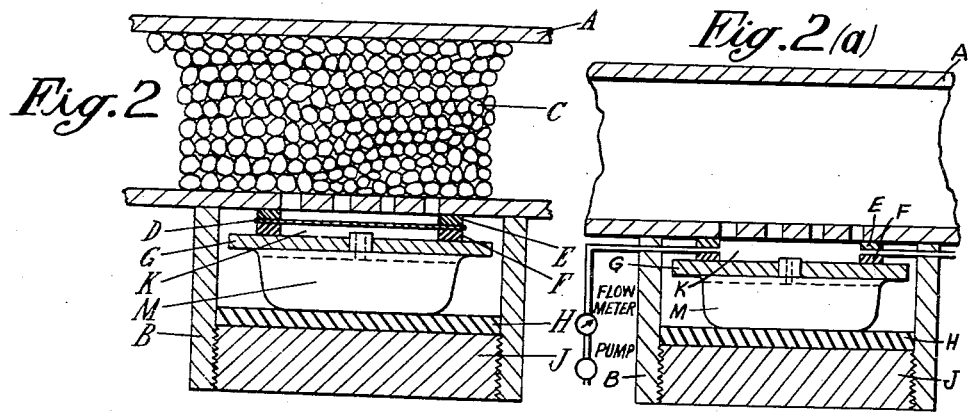
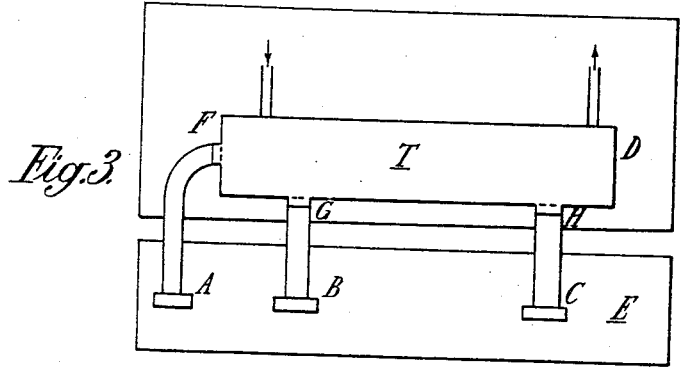

2,963,899

SONIC GAS ANALYSERS

Albert E. Martin, Donald Mounfield, and John Smart, Newcastle-upon-Tyne, England, assignors to C. A. Parsons & Company Limited, Newcastle-upon-Tyne, England Filed Mar. 6, 1956, Ser. No. 569,857

Claims priority, application Great Britain Mar. 11, 1955

5 Claims. (Cl. 73—24)

This invention relates to sonic gas analysers.

The object of the invention is to provide improved means for preventing the formation of standing waves in sonic gas analysers.

An apparatus embodying the invention in a preferred form will now first be described with reference to the accompanying drawing, and the features forming the invention will then be pointed out in the appended claims.

In the drawing:

Figs. 1(a)–1(d), inclusive, illustrate wave forms utilizable in connection with the apparatus of the invention;

Fig. 2 shows a preferred form of construction for the analysis container and sound transmitter;

Fig. 2(a) shows a modified form of this construction; and

Fig. 3 shows another modification.

The sonic or acoustic gas analyser depends on the fact that the velocity of sound varies from one gas to another, so that variations in composition can be related to changes in velocity. In one known method a source of sound is excited electrically at a constant frequency $f$ of several thousand cycles per second, and some of the acoustic energy is received by a microphone located at a distance $d$ from the source. If the velocity of sound in the gas surrounding the source and receiver is $V_1$, the finite time required for sound waves to traverse the distance $d$ will cause a time lag of $$\frac{d}{V_1}$$

or an angular lag of $$\frac{2\pi df}{V_1}$$

at the microphone. If the gas is now changed to one having a velocity $V_2$, the phase of the voltage at the microphone changes by $$\theta = 2\pi df\left(\frac{1}{V_1} - \frac{1}{V_2}\right) \quad (1)$$

It is not necessary to measure the absolute phase lag of the voltage at the microphone relative to that at the source, but merely the relative phase shift at the microphone as the gas mixture is varied. Normally, to avoid ambiguity the phase shift is not allowed to exceed $2\pi$. In order to measure the phase change an electronic circuit is employed in which D.C. is caused to flow at a certain point on the A.C. wave used for exciting the source of sound, while said current is switched off at a suitable point on the A.C. wave derived from the amplified output from the microphone, or vice versa. This interrupted D.C. is passed through a meter and owing to the high frequency of interruption and inertia of the measuring instrument gives a steady deflection which changes as the value of $\theta$ varies. In order to obtain accurate switching of the D.C. used for deflecting the indicating meter, the sinusoidal waves applied to the transmitter and received from the microphone are first squared and then differentiated by circuits well known to those versed in the art so that sharp pips are produced as shown in Figure 1(c) of the accompanying drawings. Figure 1(a) illustrates the A.C. wave and Figure 1(b) such wave after squaring. Owing to the magnitude and sharpness of these pips the meter indication is accurately proportional to the phase shift $\theta$ and only dependent to an insignificant degree on the absolute magnitude of the pips. Only pips of one polarity Figure 1(d) are used to switch D.C. on or off so that the repetition frequency of switching is $f$.

The above procedure is one of several available for the measurement of phase shifts and is merely described by way of an example.

A serious difficulty found in operating sonic gas analysers arises through the formation of stationary waves in the analysis tube with consequent disturbance of the simple phase relationship given in Equation 1. These stationary waves are formed by the interaction between the direct wave from the transmitter and the wave after reflection from the end of the tube. This reflection is strong whether the end of the tube is closed or open, and while it is possible to reduce the intensity of the reflected wave by using soft material to close the end of the tube, it is not practicable by this means to obtain the desired reduction of intensity.

The manner in which the reflected wave upsets the phase relationship of Equation 1 is indicated by the following treatment:

Let the sound pressure at distance $x$ from the reflecting surface at time $t$ be $$p \cos\left[2\pi f\left(t - \frac{x}{v}\right)\right]$$

for the direct wave and $$kp \cos\left[2\pi f\left(t + \frac{x}{v}\right) + \theta\right]$$

for the reflected wave, where $f$ is the frequency of the sound, $v$ the velocity of sound in the gas in the analysis tube, the phase change due to reflection of the sound wave at the end of the tube, and $k$ the fraction of the sound which is reflected.

The resultant pressure is:

$$p\left[\cos\left\{2\pi f\left(t - \frac{x}{v}\right)\right\} + k \cos\left\{2\pi f\left(t + \frac{x}{v}\right) + \theta\right\}\right] = R \cos(2\pi ft + \alpha)$$

where $$R = p\sqrt{1 + k^2 + 2k \cos(2\beta + \theta)}$$

when $$\beta = \frac{2\pi fx}{v}$$

and $$\tan \alpha = \frac{\sin \beta - k \sin(\beta + \theta)}{\cos \beta + k \cos(\beta + \theta)}$$

It is clear that when $k=0$, $\alpha=\beta$ and quite easily Equation 1 is obtained expressing the phase change when the velocity of sound changes from $V_1$ to $V_2$. If $k$ is not zero $\alpha$ is not generally equal to $\beta$ and Equation 1 is not obeyed.

The object of the present invention is to provide a sonic gas analyser of the kind described in which the effect of the stationary waves can be effectively eliminated or reduced.

The invention consists in brief in a sonic gas analyser comprising one or more gas containers packed with a material having interstices which provide continuous paths for gas through said material, means for admitting gas to said gas container, means for transmitting sonic or ultra-sonic vibrations through said gas, means for receiving said vibrations after transmission through said gas by way of the interstices in said packing material, and means for detecting changes in composition of the gas in the container said means being responsive to changes in the velocity of said vibrations through the gas.

In carrying the invention into effect in one form the analysis container is packed with a material having interstices which provide continuous gas passages through the material so that sonic or ultra sonic vibrations can be transmitted through the material by way of a gaseous medium. Suitable material would be for example grains of a plastic material such as polyethylene, metallic granules, or small pieces of glass or like substance. The choice of material will depend to some extent on the nature of the gas to be analysed but in general the properties of the material should be such that it is impervious to the gas under analysis and to water vapour. With corrosive gases and organic solvent vapours the material must be suitably resistant.

It is important to fill the analysis tube or container completely so that no spaces are left the size of which may lead to the formation of standing waves and also so that no movement of the particles is possible.

It has been found that a suitable particle size for a tube one inch diameter and at a sound frequency of 3000 c./s. is 1/10"–1/8" mesh. Smaller particles and even a material like glass wool eliminates standing waves but the sound attenuation is likely to be excessive and an inconveniently high back pressure may be set up in the analysis tube.

The action of the tube filling in eliminating standing waves is due to the fact that a weak reflection will occur at each particle surface and at any given point in the tube a multitude of reflections with all possible phase relationships will be received. These reflections will however, cancel one another and there will be no interference with the direct wave.

The effective path length for the sound may differ a little from the value obtained with the empty tube but this is of no consequence provided that it remains constant.

The tube filling must naturally not be allowed to press on the diaphragms of the transmitter and receiver or receivers. To obviate this possibility a barrier of metal gauze is conveniently provided to protect each diaphragm from contact with the filling material.

In a modified arrangement a diaphragm of thin glass or other suitable material is used as a barrier between the diaphragm of the transmitter, or either of the microphones, and the gas contained in the analysis tube or container. This is of practical importance when the gas is of a corrosive nature.

A preferred form of construction is shown in Figure 2 of the accompanying diagrammatic drawings to which:

A is the analysis container or tube, B a housing for a microphone or transmitter M and C the filling material. Holes are drilled in the wall of the tube to obstruct the solid granules but permitting the sound waves to pass through. D is a glass diaphragm and E a washer preferably of polytetrafluoroethylene to effect a gas seal. F and G are washers of rubber or other similar material, G are washers of rubber or other similar material, G being shaped so as to hold the microphone M in a central position within the housing in such a manner that sound is not transmitted directly from the microphone to the housing and thence to the analysis tube. The microphone is finally held in position by the resilient pad H and the screw plug J. In operation sound waves pass through the holes in the wall of the tube and cause the glass diaphragm to vibrate at their own particular frequency. The vibrating glass diaphragm sets up sound waves in the gas space K and these impinge on the diaphragm of the microphone. In the case of a transmitter, the diaphragm of M is caused to vibrate, sound waves are communicated to the glass diaphragm, which also vibrates and transmits sound waves through the analysis tube. If necessary a light filling of glass wool may be packed between the glass diaphragm and the perforated wall of the tube and again between the glass diaphragm and the diaphragm of M. This filling must not be sufficiently closely packed to obstruct the sound waves or to impede seriously the vibrations of the two diaphragms. Besides protecting the transmitter or microphone from corrosion, an important advantage is that the analysis tube can be evacuated without damage to the diaphragm of M, provided that the glass diaphragm is made strong enough for the purpose. When only a small quantity of sample gas is available it is useful to be able to evacuate the analysis tube and admit the gas directly rather than pass gas continuously through the tube.

As an alternative to the use of a diaphragm the microphones and transmitter may be protected from the gas in the analysis tube by a film of air or of inert gas, as shown in Fig. 2(a). This is achieved by causing a flow of air into the analysis tube in the vicinity of the transmitter and microphones. In this case, the diaphragm D is omitted so that the gas space K communicates with the analysis tube. However, by flowing an inert gas through the chamber K by means of the indicated connections and the pump and flow meter shown, the microphone or transmitter M may be effectively protected against the gas in the analysis tube. This air or inert gas will of course mix with the gas under test but by arranging for the ratio of sample gas to air or inert gas to be of the order of 100:1 the diluting effect of the air or inert gas will be negligible.

A further advantage of the invention lies in the fact that it enables transmitter microphones to be located in extension tubes attached to the analysis tube. This is of particular importance in those cases where the analysis tube is to be operated at elevated temperature. The filling of the extension tube with solid materials enables the transmitter and microphone to be sufficiently spaced from the analysis tube to enable them to be kept at a suitable temperature whilst avoiding the formation of standing waves in the extension tubes.

A modification of the invention illustrating this feature is shown in Figure 3 of the accompanying drawings in which the construction of the analysis tube T is modified so that it can be operated at an elevated temperature. The transmitter and microphones are fitted to extension tubes A, B and C. The analysis tube T is contained in a chamber D which can be maintained at the working temperature, while A, B and C are housed in a low temperature enclosure E. By this means of construction the transmitter and microphones can be protected from the possibly damaging temperature of the analysis tube. To prevent the formation of standing waves in the side tubes these are packed with material of the form already described. To prevent the diffusion of sample gas into the side tubes with consequential vitiation of the measurement of gas concentration, glass diaphragms as already described are fitted at F, G and H, the wall of the tube being perforated to permit passage of the sound waves.

A film of air or inert gas can of course be used instead of a diaphragm as previously described.

The invention is applicable to sonic gas analysers of the single tube type and two tube type where one tube is used to contain a comparison gas.

In the case of the two tube type the comparison tube would also contain material of the kind used to pack the analysis tube.

We claim:

1. A sonic gas analyser comprising a gas container packed with a sound reflecting material that is non-porous and impervious to water vapour and to the gas producing a multitude of reflected waves with random phase distribution and having interstices therein which provide a continuous path for the sound through the gas in the container from one end to the other thereof whilst leaving no spaces of a size permitting the formation of standing waves, means for admitting gas to said container, transmitting means coacting with the space within said container for transmitting vibrations of at least sonic frequency through the gas therein, receiving means coacting with said space for receiving the said vibrations after transmission through said gas through the interstices in the said material and responsive to changes in velocity of said vibrations through the gas for detecting changes in the composition of said gas.

2. A sonic gas analyser according to claim 1, in which the transmitting means and receiving means are separated from the packing material by a perforated wall, the size of the perforations in said wall being such as to prevent passage therethrough of the packing material.

3. A sonic gas analyser according to claim 1, comprising a perforated wall separating the transmitting means and the receiving means from th packing material, the size of the perforations being such as to prevent passage therethrough of packing material, and thin diaphragm means consisting of material resistant to corrosive gases separating the transmitting means and the receiving means from said perforated wall.

4. A sonic gas analyser according to claim 1, comprising a perforated wall separating the transmitting means and the receiving means from the packing material, the size of the perforations being such as to prevent passage therethrough of packing material, and means separating the transmitting means and the receiving means from said perforated wall, said means comprising a layer of inert gas which flows continuously between the perforated wall and the transmitting and receiving means.

5. A sonic gas analyser according to claim 1, in which the transmitting means and the receiving means are housed in extension tubes in communication with the gas container, and said extension tubes are sealed from the container by sealing means capable of transmitting vibrations of at least sonic frequency, the space within said extension tubes between said sealing means and said transmitting and receiving means being packed with material similar to the packing material of the gas container.

References Cited in the file of this patent

UNITED STATES PATENTS

| | | |
|---|---|---|
| 379,608 | Royer | Mar. 20, 1888 |
| 1,387,003 | Hedges | Aug. 9, 1921 |
| 2,775,309 | Villchur | Dec. 25, 1956 |

OTHER REFERENCES

Article: Absorption of Ultra Sonic Waves by Various Gases, by T. P. Abello, published in Physical Review, vol. 31, June 1928, pages 1083–1086.